Figure 1:
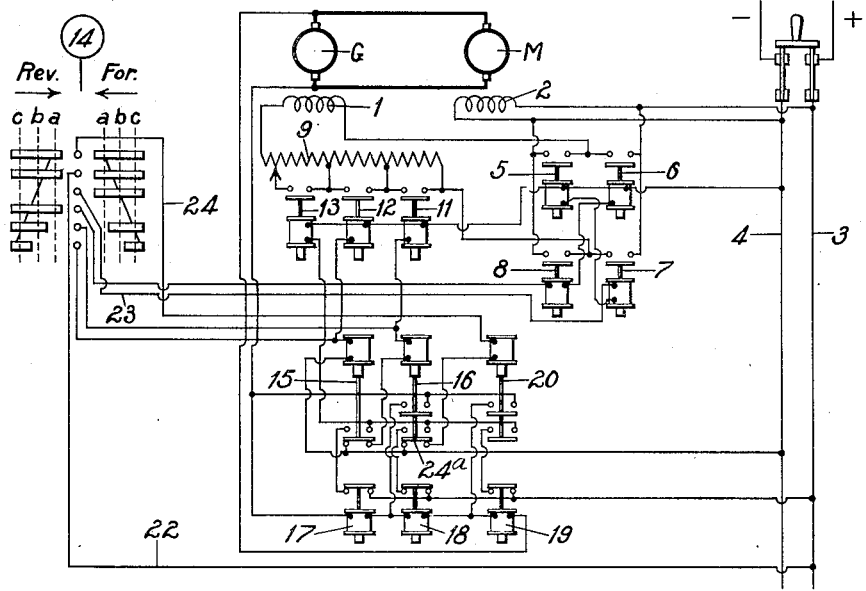

E. A. HANFF.
ELECTRICAL SYSTEM.
APPLICATION FILED DEC. 9, 1916.

1,367,139.

Patented Feb. 1, 1921.
2 SHEETS—SHEET 1.

WITNESSES:
R. J. Fitzgerald.
J. R. Langley.

INVENTOR
Edward A. Hanff.
BY
Wesley G. Carr
ATTORNEY

UNITED STATES PATENT OFFICE.

EDWARD A. HANFF, OF IRWIN, PENNSYLVANIA, ASSIGNOR TO WESTINGHOUSE ELECTRIC AND MANUFACTURING COMPANY, A CORPORATION OF PENNSYLVANIA.

ELECTRICAL SYSTEM.

1,367,139.   Specification of Letters Patent.   Patented Feb. 1, 1921.

Application filed December 9, 1916. Serial No. 136,018.

*To all whom it may concern:*

Be it known that I, EDWARD A. HANFF, a citizen of the United States, and a resident of Irwin, in the county of Westmoreland and State of Pennsylvania, have invented a new and useful Improvement in Electrical Systems, of which the following is a specification.

My invention relates to electrical systems and particularly to systems in which the speed and direction of rotation of electric motors are controlled by varying the field excitation and polarity of electric generators in circuit therewith.

My invention has for its object to provide a simple and efficient means for temporarily impressing a high voltage upon the field-magnet windings of an electric generator in order to cause the voltage of the latter to more quickly reach a value corresponding to the adjustment of the controlling mechanism.

In the operation of reversing rolling mills and similar machines where frequent stops and reversals are necessary, it is desirable that the voltage of the generators which supply energy to the driving motors shall be quickly responsive to the adjustments of the controlling devices in order to prevent undue loss of time in accelerating the motors. It is well known that, if only the normal exciter voltage is applied to the field-magnet windings of a generator, an appreciable amount of time must elapse before the generator voltage reaches a value corresponding to the position of the controller. The period of time necessary to overcome the inductance of the generator field circuit may be materially shortened by temporarily applying an abnormally high voltage.

I provide an arrangement comprising the usual resistor in series with the generator field-magnet windings and a series of electromagnetic switches for controlling the resistor. The voltage of the exciter is materially higher than that normally applied to the generator field-magnet windings. A portion of the resistor, which is normally in circuit with the generator field-magnet windings and which may be termed the "field-forcing" section, is controlled by a relay which establishes a shunt circuit for it when the generator voltage is below the normal value corresponding to the position of the controller. This shunt circuit is opened by the relay when the generator voltage reaches the value corresponding to the adjustment of the controller.

It has been found, in practice, that it is difficult to design a single relay for controlling what may be termed the "field-forcing" relay. My invention embodies a plurality of relays corresponding to the positions of the controller for determining the conditions under which the field-forcing relay operates.

For some applications, it is desirable that the rate of acceleration of the motor may be controlled as desired by the operator. This result may be accomplished to some degree by actuating the usual controller in a step-by-step manner. I provide an arrangement in which the effective portion of the field-forcing resistor may be varied in accordance with the position to which the controller is adjusted. By means of this arrangement, the controller may be actuated by a quick movement to a position corresponding to the rate at which it is desired to accelerate the motor.

Figure 2:
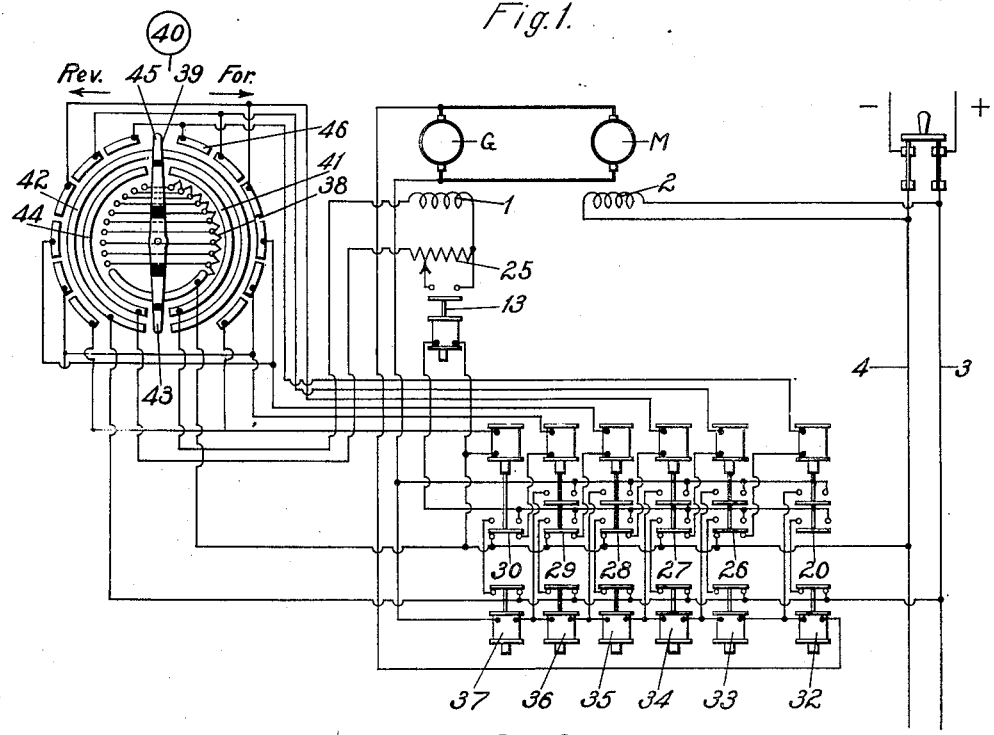
Figure 3:
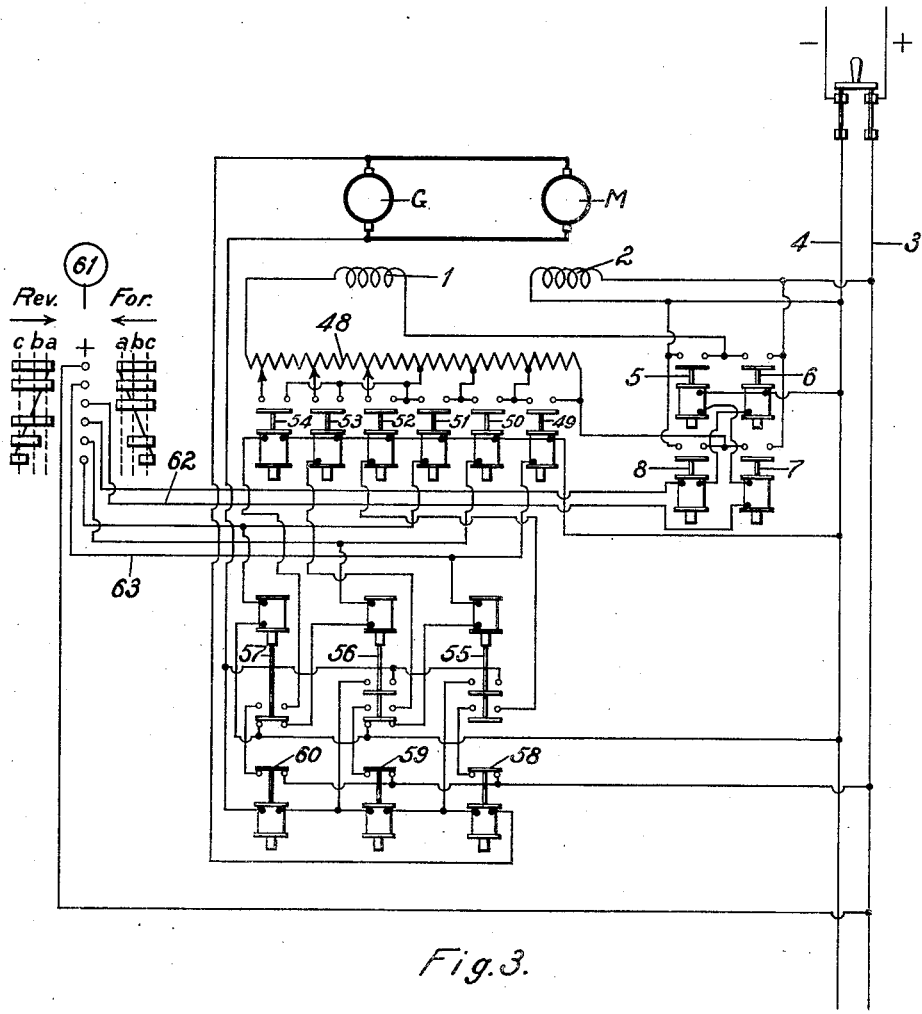

In the accompanying drawings, Figure 1 is a diagrammatic view of circuits and apparatus embodying my invention. Figs. 2 and 3 are views, similar to Fig. 1, of modifications.

The armatures of a generator G and a motor M are permanently connected in a closed circuit. The generator field-magnet winding 1 and the motor field-magnet winding 2 are connected to line conductors 3 and 4 which may be connected to any suitable source of substantially constant voltage. The connections of the field-magnet winding 1 are controlled by reversing switches 5, 6, 7 and 8.

A resistor 9, which is in series relation with the field-magnet winding 1, is controlled by electromagnetic switches 11 and 12 and a relay 13. The number of switches for controlling the resistor 9 may be such as is desired, a limited number only being shown for the sake of simplicity. The circuits of the actuating coils of switches 11 and 12 are controlled in accordance with the position of a master switch 14.

The circuit of the actuating coil of relay 13 is controlled in accordance with the relation of the value of the generator voltage to that corresponding to the position of the master switch 14. This result is obtained by so arranging the circuit of the actuating coil of relay 13 that it is controlled in accordance with the positions of relays 15 and 16, that are controlled directly by the master switch 14, and the positions, also, of relays 17, 18 and 19 that are controlled in accordance with the generator voltage. The actuating coils of the latter relays are connected in series relation across the terminals of the generator. The circuit of the actuating coil of relay 13 is controlled also by a relay 20 having an actuating coil controlled in accordance with the positions of relays 15 and 16.

It may be assumed that the motor M is stationary and that the generator G is driven by any suitable means at a substantially constant speed. It may be assumed further that the master switch is in its illustrated or inactive position in which the several reversing switches and the switches and relays for controlling the voltage of the generator G are in their respective illustrated positions.

To start the motor in the forward direction, the master switch 14 is actuated to the left, as viewed in Fig. 1. When the master switch occupies position $a$, a circuit is established which extends from conductor 3 through conductor 22, master switch 14, conductor 23 and actuating coils of reversing switches 7 and 5 to conductor 4. The reversing switches 5 and 7 close to complete the circuit of the generator field-magnet winding 1 through the resistor 9.

A second circuit, which is also established by the master switch 14 in position $a$, extends from the switch 14, which is connected to the positive side of the exciter circuit, through conductor 24, actuating coil of relay 20 and interlock 24$^a$ of relay 16 to conductor 4. The relay 20 closes to complete a circuit for the actuating coil of relay 13 which extends from conductor 3 through relay 19, lower contact member of relay 20 and actuating coil of relay 13 to line conductor 4.

The relay 13 closes to complete a shunt circuit for the section of the resistor 9 controlled by it. The voltage applied to the field-magnet winding 1 is accordingly materially higher than that corresponding to the first position of the controller in which the entire resistor 9 is normally in circuit with the field-magnet winding 1.

It will be noted that, upon the closing of relay 20, a circuit is completed by the upper contact member of the relay for shunting the actuating coils of relays 17 and 18 and thereby connecting the actuating coil of relay 19 directly across the terminals of the generator. Inasmuch as the master switch 14 has three operative positions, the coils of relays 17, 18 and 19 are each adapted to actuate the corresponding relays when the generator voltage reaches a value approximately one-third that of its maximum normal value.

When the generator voltage reaches a value corresponding to the first position of the master switch, relay 19 is actuated to open the circuit of the actuating coil of relay 13 and the latter opens to insert the section of resistor controlled by it in circuit with the field-magnet winding 1. The generator voltage remains at the value corresponding to the first position of the controller.

When the controller is actuated to position $b$, the circuit of the actuating coil of switch 11 is completed, and the latter closes to shunt a corresponding section of resistor 9. The circuit of the actuating coil of relay 16 is also completed through relay 15. The relay 16 closes to complete a circuit of the actuating coil of relay 13 which comprises relay 18, lower contact member of relay 24$^a$ and actuating coil of relay 13.

The relay 13 again closes to shunt the corresponding section of the resistor, and the voltage applied to the field-magnet winding 1 is higher than that corresponding to the second position of the controller. The closing of relay 16 operates to complete a shunt circuit for the actuating coil of relay 17, and the actuating coils of relays 18 and 19 are accordingly connected in series relation across the terminals of the generator G.

When the voltage of the generator reaches a value that is approximately two-thirds of its normal value, the relays 18 and 19 open to break the circuit of actuating coil 13 at relay 18. The voltage of the generator G then remains substantially constant at a value corresponding to the second position of the controller in which the section of resistor 9 that is controlled by switch 11 is shunted.

The actuation of the master switch to position $c$ effects the closing of relay 15 to complete a circuit for the actuating coil of relay 13. A circuit is also completed for the actuating coil of switch 12, and the latter closes simultaneously with the relay 13. The entire resistor 9 is shunted and the maximum exciter voltage is applied to field-magnet winding 1.

The actuating coils of relays 17, 18 and 19 are in series across the terminals of the generator, and, when the voltage of the latter reaches its normal maximum value, the relay 17 opens to interrupt the circuit of the actuating coil of relay 13, and the latter, accordingly, inserts the corresponding resistor section in circuit with the field-magnet winding 1. The generator then operates at its normal voltage.

The operation has been described as having taken place in a step-by-step manner. In practice, however, the master switch 14 may be actuated by a quick movement from its "off" position to that corresponding to the maximum voltage of the generator. In this case, the circuits of the actuating coils of switches 11 and 12 are closed and the latter operate to shunt the respective sections of resistor 9. Relays 15, 16 and 20 are closed, but the latter two relays open again, inasmuch as the circuits of their respective actuating coils are open at relays 15 and 16. The field-forcing section of the resistor 9 is shunted by relay 13, the closing circuit for the latter being completed by relay 15. The generator voltage increases very rapidly because of the abnormal field excitation. When the voltage reaches a normal value, the relays 17, 18 and 19 open as previously described. The relay 17 opens the circuit of the actuating coil of relay 13 and the latter operates to insert the field-forcing resistor section into the field circuit.

Reference may now be had to Fig. 2 in which a modification of the system of Fig. 1 is illustrated. Similar reference numerals are employed to designate corresponding parts. A field-forcing resistor 25, controlled by the relay 13, corresponds to the resistor section of Fig. 1 that is controlled by relay 13.

The circuit of the actuating coil of relay 13 is controlled by a relay 20 and by relays 26, 27, 28, 29 and 30 that correspond respectively to relays 20 and 15 and 16 of the system of Fig. 1. Relays 32, 33, 34, 35, 36 and 37 correspond to relays 17, 18 and 19 of the system shown in Fig. 1. A variable resistor 38, that is in series with the field-magnet winding 1, is controlled by the movable arm 39 of a master switch 40.

When the movable arm 39 is actuated, for example, to the right, as viewed in Fig. 2, to engage a contact segment 41, a circuit is completed which extends from conductor 3 through contact segment 42, bridging contact member 43, contact segment 44, field-forcing resistor 25, field-magnet winding 1, contact segment 41, bridging contact member 45 and resistor 38 to conductor 4. The field-magnet winding 1 is excited in such manner that the generator G supplies current to the motor M for operation in the forward direction.

In the first position of the movable arm 39, it engages a contact segment 46 to establish a circuit for the actuating coil of relay 20. The latter then closes to complete a circuit for the actuating coil of relay 13 and the latter completes a shunt circuit for the field-forcing resistor 25. The relay 20 establishes a shunt circuit for the actuating coils of relays 33 to 37 which are connected in series relation with each other and with the actuating coil of relay 32 across the terminals of the generator. The actuating coils of relays 32 to 37 are arranged to operate the corresponding relays when the voltage across their respective terminals reaches a value approximately one-sixth that of the normal voltage of the generator.

When the generator voltage reaches a value corresponding to the first position of the controller, or approximately one-sixth of its maximum value, the relay 32 opens to interrupt the circuit of field-forcing relay 13 and the resistor 25 is again inserted in circuit with the field-magnet winding 1. In like manner, the relays 26 to 30 are closed upon the successive actuation of the controller arm to its several operative positions. The relays 33, 34, 35, 36 or 37, as the case may be, operate to open the circuit of the actuating coil of relay 13 when the voltage of the generator reaches the value corresponding to the position of the controller.

If the controller is actuated by a quick movement to the position corresponding to the maximum voltage of the generator, the relay 30 is closed and all of the actuating coils of relays 32 to 37 are connected across the terminals of the generator. When the generator voltage reaches its maximum value, the several relays 32 to 37 open and the circuit of the actuating coil of relay 13 is opened at relay 37. The generator then operates at its normal maximum value.

Reference may now be had to Fig. 3, in which a second modification of the system of Fig. 1 is illustrated. This system differs from that of Fig. 1 in that the field-forcing resistor section is controlled by a number of relays in order to vary the voltage applied to the generator field-magnet winding in excess of that corresponding to the position of the controller. By means of this arrangement, the rate of acceleration of the motor may be varied in accordance with the voltage of the generator and the speed of the motor for which the controller is adjusted.

Parts corresponding to parts of the system of Fig. 1 are designated by like reference characters. A resistor 48, which is in circuit with the generator field-magnet winding 1, is controlled by electromagnetic switches 49, 50 and 51 and by field-forcing relays 52, 53 and 54. The circuits of the actuating coils of the field-forcing relays 52, 53 and 54 are respectively controlled by relays 55, 56, and 57 and by relays 58, 59 and 60.

The relays 55, 56 and 57 are controlled by a master switch 61. The actuating coils of relays 58, 59 and 60 are connected across the terminals of the generator and each of the latter relays is designed to operate when the voltage across its terminals is approximately one-third of the maximum voltage of the generator.

When the controller 61 is actuated to the left, as viewed in Fig. 3, a circuit is completed which extends from conductor 3 through controller 61, conductor 62 and actuating coils of reversing switches 7 and 5 to conductor 4. The reversing switches 5 and 7 close to complete the circuit of field-magnet winding 1 which comprises resistor 48.

When the controller is in its first position, circuits are also completed which extend from conductor 3, through controller 61, conductors 63, through the respective actuating coils of switch 49 and relay 55. The switch 49 closes to complete a shunt circuit for a section of resistor 48. The relay 55 closes to complete a circuit for the actuating coil of field-forcing relay 52 which comprises relay 58. The relay 55, upon closing, completes a circuit for shunting the actuating coils of relays 59 and 60.

When the generator voltage reaches a value approximately one-third that of its maximum value, relay 58 opens to break the circuit of the actuating coil of field-forcing relay 52. The field-forcing relay 52 opens to again insert the sectional resistor controlled by it in circuit with the field-magnet winding.

When the controller is actuated to position b, the switch 50 and the relay 56 close in the manner described above in connection with the first position of the controller to respectively complete a shunt circuit for a second section of the resistor 48 and to complete a circuit for the actuating coil of field-forcing relay 53. The latter relay closes to complete a shunt circuit for a portion of the resistor 48 which includes that controlled by the relay 52. When the generator voltage reaches a value approximately two-thirds that of its normal value, the circuit of the actuating coil of relay 53 is opened by relay 59, and the resistor portion controlled by the relay 53 is again inserted in the field circuit.

The actuation of the controller 61 to its final position effects the closing of switch 51 and relay 57. The closing of the latter relay completes a circuit for the actuating coil of field-forcing relay 54, and the latter completes a shunt circuit for the entire field-forcing section of the resistor 48. The relay 54 opens when the circuit of its actuating coil is broken at relay 60. This action occurs when the generator voltage reaches a maximum value.

The controller may be actuated by a quick movement to the position corresponding to the desired speed. The voltage applied to the generator field-magnet windings varies in accordance with the operating speed selected in order to correspondingly decrease the time ordinarily required for accelerating a motor to that speed.

By means of the above described arrangements the voltage of electric generators may be controlled, as desired, in order to vary the speed and direction of operation of electric motors. Abnormal voltages are applied to the field-magnet windings of generators until the voltages of the latter reach values corresponding to the positions of the controlling devices.

The rate of acceleration of the motors is controlled by adjusting the degree of field-forcing applied to the generator field-magnet windings. This result is accomplished by varying the effective portion of the field-forcing resistor in accordance with the position of the controller.

I claim as my invention:

1. In an electrical system, the combination with an electric generator, of means for controlling the field excitation of said generator, said means comprising a controller, a plurality of relays having coils in circuit with said generator and means for selectively rendering said coils effective or ineffective in accordance with the position of said controller.

2. In an electrical system, the combination with an electric generator, of means for controlling the field excitation of said generator, said means comprising a controller, a plurality of relays having coils in circuit with said generator and means for controlling shunt circuits for said coils in accordance with the position of said controller.

3. In an electrical system, the combination with an electric generator, of means for controlling the field excitation of said generator, said means comprising a controller, a plurality of relays having coils in circuit with said generator and means for selectively energizing or deënergizing said coils in accordance with the position of said controller.

4. In an electrical system, the combination with an electric generator having a field-magnet winding and a resistor in circuit therewith, of means for controlling the effective portion of said resistor, said means comprising a controller, a plurality of switches controlled by said controller, and a relay for controlling a portion of said resistor, and means comprising a plurality of coils in circuit with said generator for controlling said relay.

5. In an electrical system, the combination with an electric generator having a field-magnet winding and an accelerating resistor and a field-forcing resistor in circuit therewith, of means for controlling said resistors, said means comprising a controller, and means controlled by said controller for shunting said accelerating resistor and for shunting a portion of said field-forcing resistor.

6. In an electrical system, the combination with an electric generator having a field-magnet winding and an accelerating resistor and a field-forcing resistor in circuit therewith, of means for controlling said resistors, said means comprising a controller, means controlled by said controller for shunting said accelerating resistor and means controlled in accordance with the value of the generator voltage relatively to that for which the controller is adjusted, for shunting said field-forcing resistor and for varying the portion of said field-forcing resistor which is short-circuited.

7. In an electrical system, the combination with an electric generator having a field-magnet winding and an accelerating resistor and a field-forcing resistor in circuit therewith, of means for controlling said resistors, said means comprising a controller, means controlled by said controller for shunting a portion of said accelerating resistor and means controlled in accordance with the value of the generator voltage relatively to that for which the controller is adjusted, for shunting a portion of said field-forcing resistor and for varying said second portion in accordance with the adjustment of said controller.

8. In an electrical system, the combination with an electric generator, of means for controlling the field excitation of said generator, said means comprising a relay having a coil in circuit with said generator and means for controlling a shunt circuit for said coil.

9. In an electrical system, the combination with an electric generator having an armature winding, a field-magnet winding, a resistor in circuit with said field-magnet winding and a switch for short-circuiting said resistor and having an actuating coil, of a switch for closing the circuit of said coil and a switch having an actuating coil in circuit with said armature for rendering said first switch inoperative.

10. In an electrical system, the combination with an electric generator having a field-magnet winding and a resistor comprising an accelerating portion and a field-forcing portion in circuit therewith, of means for short-circuiting said accelerating portion, means for short-circuiting said field-forcing portion and means for varying the amount of said field-forcing portion which is short-circuited.

In testimony whereof, I have hereunto subscribed my name this 11th day of November 1916.

EDWARD A. HANFF.